United States Patent [19]

Kanamaru et al.

[11] Patent Number: 4,961,116
[45] Date of Patent: Oct. 2, 1990

[54] METHOD OF, AND APPARATUS FOR, FACILITATING SYCHRONIZATION OF RECORDED AUDIO AND VIDEO INFORMATION

[75] Inventors: Hitoshi Kanamaru; Tsuyoshi Watanabe, both of Saitama, Japan

[73] Assignee: Pioneer Electronic Corporation, Tokyo, Japan

[21] Appl. No.: 122,811

[22] Filed: Nov. 19, 1987

[30] Foreign Application Priority Data

Nov. 19, 1986 [JP] Japan .................................. 61-277557

[51] Int. Cl.[5] ............................................. H04N 5/76
[52] U.S. Cl. .................................... 358/343; 358/342; 360/19.1
[58] Field of Search ............... 358/310, 335, 342, 343; 360/19.1, 20, 27, 40, 48; 369/32, 47

[56] References Cited

U.S. PATENT DOCUMENTS

| | | |
|---|---|---|
| 3,919,716 | 11/1975 | Yumde et al. |
| 4,473,850 | 9/1984 | Foerster et al. ................ 358/343 X |
| 4,647,985 | 3/1987 | Yokosawa ...................... 358/343 X |
| 4,656,528 | 4/1987 | Shichijo et al. ................. 358/343 X |
| 4,680,647 | 7/1987 | Moriyama ....................... 360/19.1 X |
| 4,717,972 | 1/1988 | Heitmann . |
| 4,729,041 | 3/1988 | Kuroda .......................... 358/343 X |
| 4,752,832 | 6/1988 | Higurashi ....................... 360/19.1 X |
| 4,766,504 | 8/1988 | Narusawa et al. ............... 358/343 X |
| 4,768,104 | 8/1988 | Kanamaru ...................... 358/343 X |
| 4,768,106 | 8/1988 | Ito et al. ........................ 358/343 X |

FOREIGN PATENT DOCUMENTS 0192412  8/1986  European Pat. Off. .
2157913 10/1985  United Kingdom .

OTHER PUBLICATIONS

"Recording and Reproducing System", Japanese Patent Abstract, vol. 8, No. 271 (P-320)[1708], 12/12/84, JP-A-59 140 602, (Pioneer K. K.) 13-08-1984.

*Primary Examiner*—Robert L. Richardson
*Assistant Examiner*—W. R. Young
*Attorney, Agent, or Firm*—Sughrue, Mion, Zinn, Macpeak & Seas

[57] ABSTRACT

An improved method for recording audio and video information together on a video disk or the like wherein the position of the audio information is made to coincide closely with that of the video information. Both the video and the audio information are divided into blocks. At the start of recording of one block of video data, recording of a block of audio data one block behind is commenced. At the end of the recording of the block of audio data, if the time remaining for recording the block of video data is less than a predetermined value, a subsequent block of audio information is recorded, while if the time remaining is greater, a block of inserted data, such as audio silence, is recorded.

11 Claims, 5 Drawing Sheets

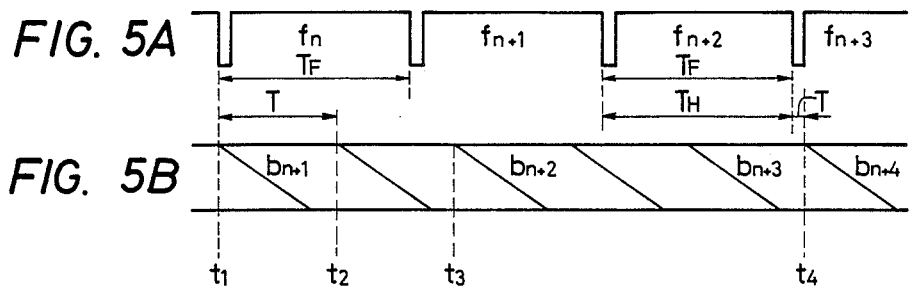
FIG. 5A
FIG. 5B
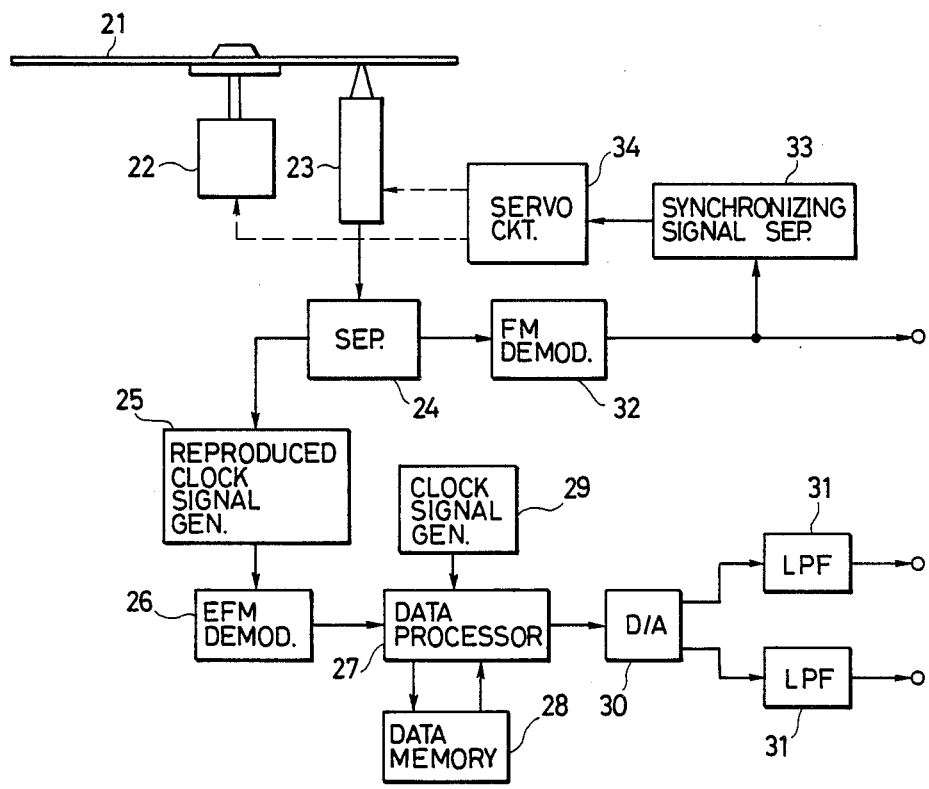
FIG. 6

FIG. 7
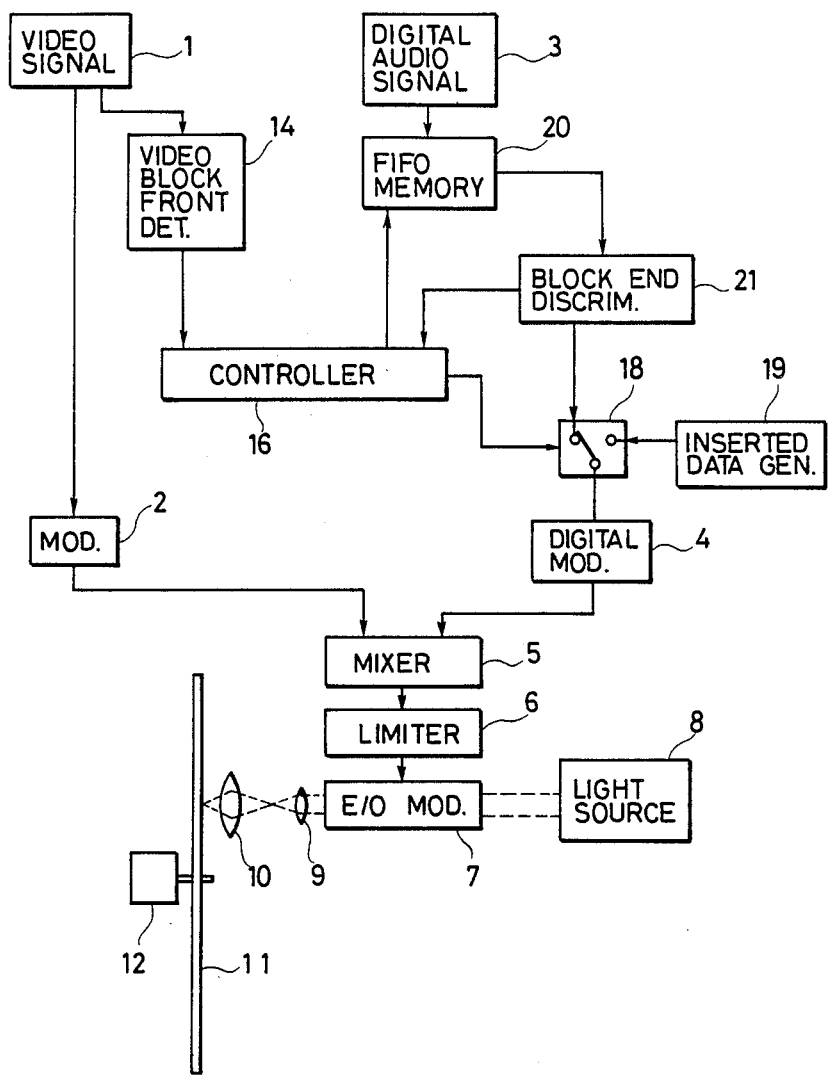
FIG. 8A
FIG. 8B
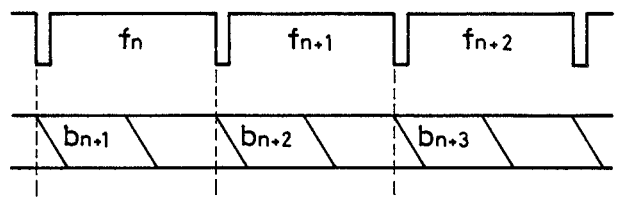

METHOD OF, AND APPARATUS FOR, FACILITATING SYCHRONIZATION OF RECORDED AUDIO AND VIDEO INFORMATION

BACKGROUND OF THE INVENTION

The present invention relates to a method of recording data, and particularly relates to a method in which video information, namely, a video format signal in the form of a signal timewise divided into blocks and information divided into blocks corresponding to the video information, is recorded in a multiplex manner.

FIG. 1 shows schematically a recorder with which a composite video signal (for brevity hereafter referred to merely as a video signal) having a block structure and another signal divided into blocks are recorded in a multiplex manner employing a conventional method of recording. A video signal from a video signal generator 1 such as a video tape recorder is supplied to a modulator 2 where the video signal is subjected to frequency modulation. At the same time, a digital signal from a digital audio signal generator 3 such as a digital audio tape recorder is supplied to a digital modulator 4. The digital signal from the audio signal generator 3 may be in the form of digital data corresponding to sampled values obtained by sampling an audio signal related to the video signal from the video signal generator 1. The digital data corresponding to the audio signal for a time period corresponding to one field of the video signal constitute one block. The digital modulator 4 modulates the output from the digital audio signal generator 3, adds an error correction code, performs interleaving, etc., employing an EFM (eight-to-fourteen modulation) method.

The output from the modulator 2 and the digital modulator 4 are together by a mixer 5 formed of an addition circuit, etc. The output from the mixer 5 is converted into a rectangular signal by a limiter 6. The rectangular signal is supplied to an E/O (electrooptical) modulator 7. After a light beam from a laser light source 8 is modulated by the E/O modulator 7, the light is diffused by a collimator lens 9 and condensed into a light spot of about $1\mu$ in diameter on the recording surface of a matrix disk 11 by a converging lens 10, whereby a layer of photoresist or the like constituting the recording surface is exposed to the light spot. A motor 12 and a servo loop (not shown in the drawings) operate so that the matrix disk 11 is rotated at a prescribed speed and the recording spot advances radially at a rate of about $2\mu$ per rotation.

The above-described recorder records the video signal and the digital audio signal on the recording disk in a format as shown in FIGS. 2A and 2B. Among a plurality of blocks formed by dividing the video signal on the basis of a vertical synchronizing signal, blocks corresponding to n-th, (n+1)-th and (n+2)-th fields $f_n$, $f_{n+1}$ and $f_{n+2}$, respectively, are sequentially recorded as shown in FIG. 2A. With reference to FIG. 2B, the n-th, (n+1)-th and (n+2)-th blocks $b_n$, $b_{n+1}$ and $b_{n+2}$ of the digital audio signal, which correspond respectively to the n-th, (n+1)th and (n+2)-th fields $f_n$, $f_{n+1}$ and $f_{n+2}$ of the video signal, are sequentially recorded with a timing independent that of the recording of the video signal. Consequently, the mutually corresponding blocks of the video signal and the digital audio signal are not necessarily recorded in the same position during multiplex recording. As a result, in the conventional method of recording, the video signal and the digital audio signal cannot be reproduced synchronously with regard to the blocks thereof, and hence the video signal and the audio signal relating thereto cannot be reproduced immediately after address search. Therefore, the video signal and the audio signal cannot be efficiently utilized.

SUMMARY OF THE INVENTION

Accordingly, it is an object of the present invention to provide a method in which video information and prescribed other information such as audio information which relate to each other can be recorded in a multiplex manner on a recording medium in such a manner so as to be efficiently utilized and the video and audio signals can be reproduced immediately after an address search operation.

The inventive method is characterized in that, while one of the blocks of the block-composed video information is being recorded, the recording of the block of the prescribed information which corresponds to the video information block following the video information block being recorded is started.

BRIEF DESCRIPTION OF THE DRAWINGS

FIGS. 5A and 5B show the format of information recorded on a recording medium by the disk recorder;

FIG. 6 is a block diagram of a player for reproducing the information recorded by the disk recorder;

FIG. 7 shows a block diagram of a disk recorder employing a recording method in accordance with another preferred embodiment of the present invention; and FIGS. 8A and 8B show the format of information recorded on a recording medium by the recorder shown in FIG. 7.

DESCRIPTION OF THE PREFERRED EMBODIMENTS

A preferred embodiment of the present invention will hereafter be described in detail with reference to the attached drawings.

Figure 1:
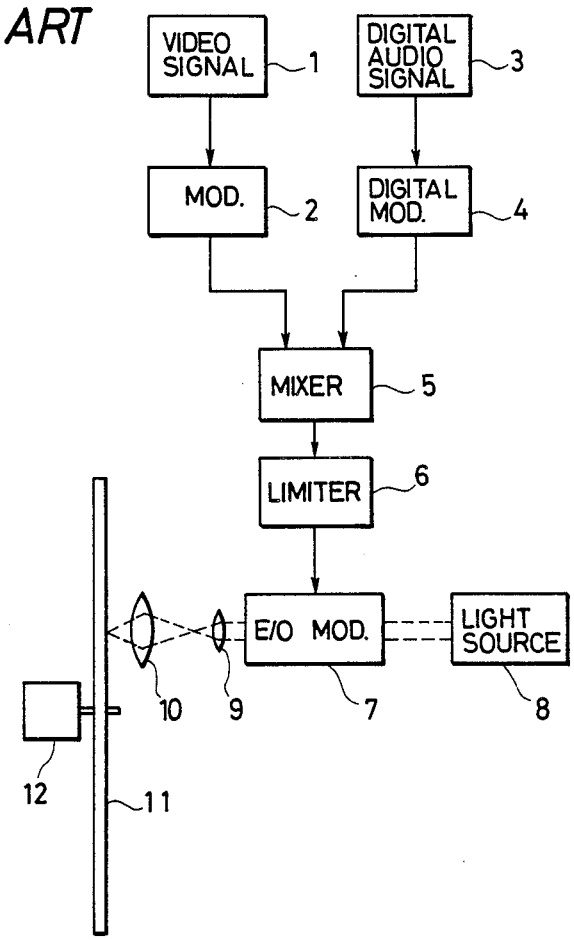
FIG. 1 shows a block diagram of a recorder for use with a conventional recording method.
Figure 2A:
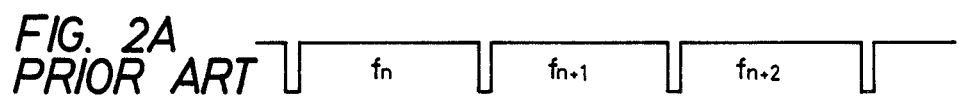
FIGS. 2A and 2B show the format of information recorded on a recording medium by the recorder shown in FIG. 1.
Figure 2B:
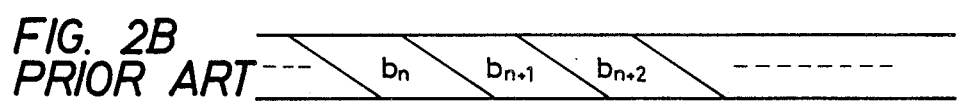
Figure 3:
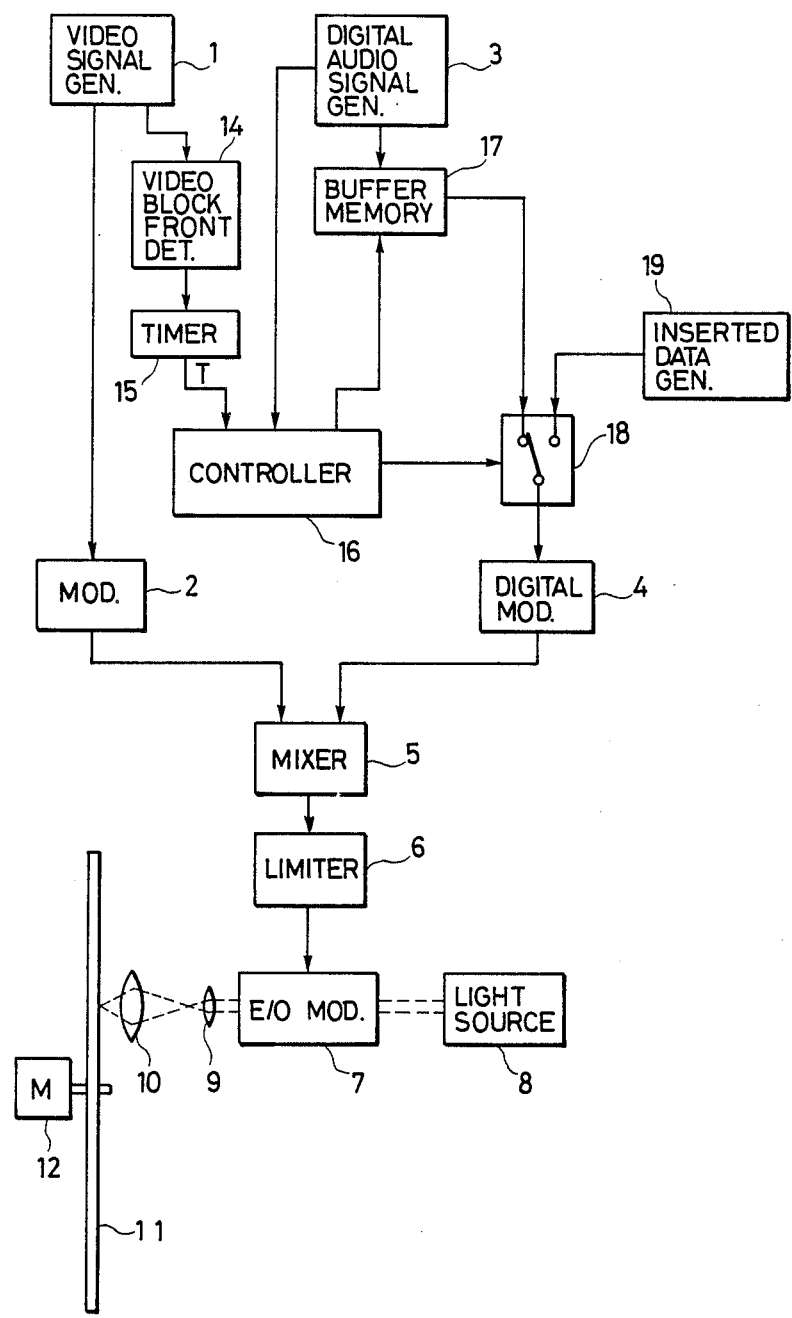
FIG. 3 shows a block diagram of a disk recorder employing a recording method in accordance with a preferred embodiment of the present invention.

FIG. 3 shows recorder including a video signal generator 1, a modulator 2, a digital modulator 4, a mixer 5, an E/O modulator 7, a laser light source 8, a collimator lens 9, a converging lens 10, a matrix disk 11, and a motor 12 arranged in the same manner as the recorder shown in FIG. 1. However, in accordance with the invention the video signal from the video signal generator 1 is supplied to a video block front detector 14 implemented with a synchronizing signal separator circuit and related components. When a vertical synchronizing signal included in the video signal supplied to the video block front detector 14 is outputted, a front detection signal is generated by the detector and supplied to a timer 15, constructed of a counter, whose count is sequentially changed by a clock signal of prescribed frequency and which is reset by the front detection signal.

Data T are supplied from the timer 15 to a controller 16 in accordance with a command from the controller. However, when the length of the data T becomes equal to the length $T_F$ of the video signal block, the data T are supplied form the timer 15 independent of the command from the controller 16, and are latched as data $T_M$ in a memory (not shown) provided within the controller 16.

A digital audio signal from a digital audio signal generator 3 is supplied to the controller 16 and a buffer memory 17 which delays the supplied digital data by storing the data during the time a read-stop command is present. For example, the buffer memory 17 may be constructed of a memory which sequentially stores the digital data and a circuit for sequentially reading the digital data from the memory when the read-stop command is not present. The digital data from the buffer memory 7 are supplied to one input terminal of a switch 18. Output data from an inserted data generation circuit 19 are supplied to the other input terminal of the switch 18. For example, the inserted data generation circuit 19 outputs digital data corresponding to an audio signal whose level is zero. The switch 18 functions so that the output data from the buffer memory 17 or those from the inserted data generation circuit 19 are selectively sent out from the switch in accordance with a change-over command. The output data from the switch 18 are supplied through a digital modulator 4 to the mixer 5 and there mixed with the output from the modulator 2.

The controller 16 is implemented with a microcomputer including a processor, a ROM (read-only memory), a RAM (random access memory), a timer, etc.

Figure 4:
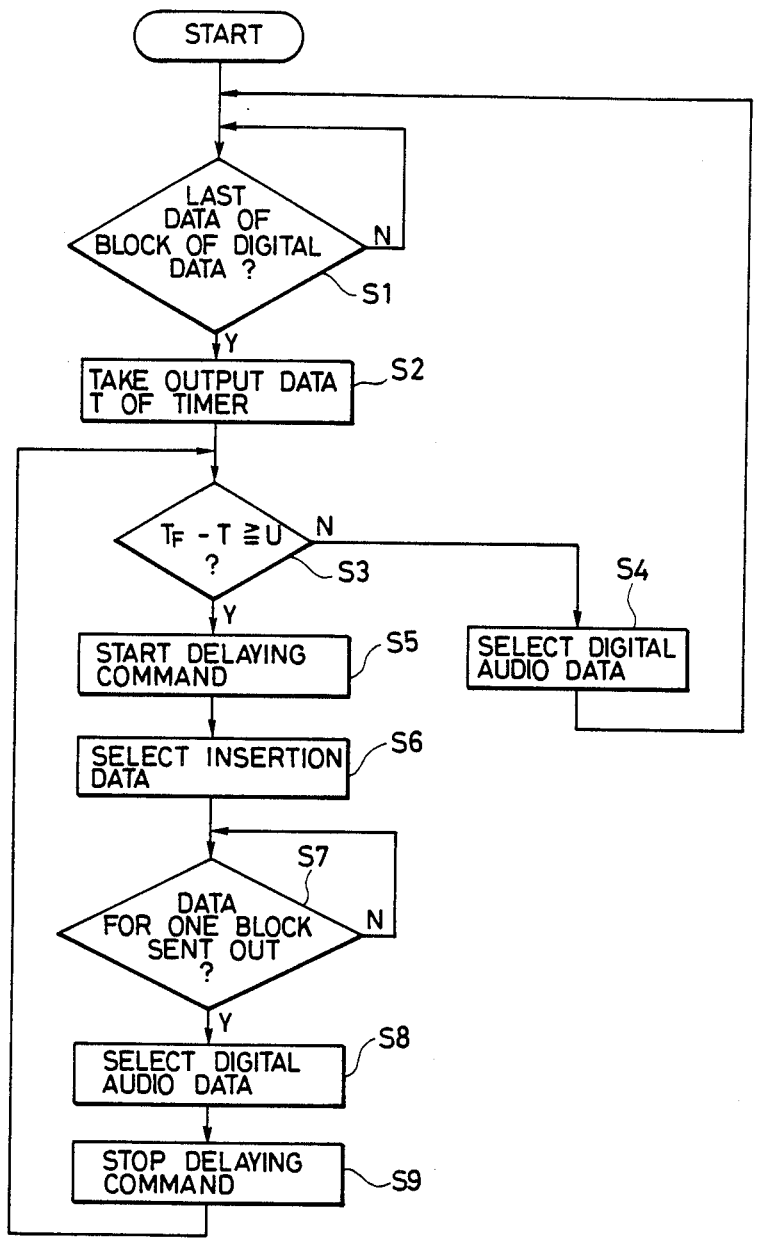
FIG. 4 shows a flowchart of the operations of the controller of the disk recorder.

The operation of the processor of the controller 16 will now be described with reference to the flowchart shown in FIG. 4. When power is applied, the processor proceeds to step $S_1$ to judge whether or not the last data of the block of a digital audio signal have been sent out. For example, the judgment in step $S_1$ can be made by counting the number of consecutive data, the initial one of which corresponds to a signal indicative of the front of the block of a synchronizing signal or the like included in the output data from the digital audio signal generator 3. If it is judged in step $S_1$ that the last data of the block of the digital audio signal have not been sent out, the processor executes step $S_1$ again. When it is judged in step $S_l$ that the last data of the block of the digital audio signal have been sent out, the processor proceeds to step $S_2$ to take in the data from the timer 15. At this time, the data $T_M$ which has been latched in the memory of the controller 16 are added to the data T to thereby compose new data T. The processor then proceeds to step $S_3$ to judge whether or not a value obtained by subtracting T from $T_F$ is equal to or less than a prescribed value U. When it is judged in step $S_3$ that the value $T_F$-T is less than the prescribed value U, the processor proceeds to step $S_4$, whereupon digital audio data, namely, the output data from the buffer memory 17, are selectively sent out from the switch 18. The processor then returns to step $S_1$. If it is judged in step $S_3$ that the value $T_F$-T is equal to or more than the prescribed value U, the processor proceeds to step $S_5$ to send out the read-stop command to the buffer memory 17. The processor then proceeds to step $S_6$ where inserted data, which are the output data from the inserted data generation circuit 19, are selectively sent out from the switch 18. The processor thereafter proceeds to step $S_7$ to judge, on the basis of the output data from the digital audio signal generator 3, whether or not inserted data for one block have been supplied to the digital modulator 4. When it is judged in step $S_7$ that the inserted data corresponding to one block have been supplied to the digital modulator 4, the processor proceeds to step $S_8$ where the digital audio data are selectively sent out from the switch 18. The processor then proceeds to step $S_9$ to stop the read-stop command to the buffer memory 17, and thereafter returns to step $S_3$.

The video signal and the digital audio signal are recorded on the recording disk 11 by the above-described recorder in the format shown in FIG. 5. Among a plurality of blocks defined by dividing the video signal on the basis of its vertical synchronizing signal, blocks corresponding to n-th, (n+1)-th and (n+2)-th fields $f_n$, $f_{n+1}$ and $f_{n+2}$, respectively, are sequentially recorded as shown in FIG. 5A. When the vertical synchronizing signal of the video signal is present, the video block front detector 14 sends out the front detection signal so that the output data from the timer 15 are set to zero.

At the time point $t_1$ of the generation of the vertical synchronizing signal indicative of the front of the n-th field $f_n$ of the video signal, the (n+1)-th block $b_{n+1}$ of the digital audio signal begins to be sent out from the digital audio signal generator 3. At a time point $t_2$ when a time $T_B$ corresponding to the block length of the digital audio signal has elapsed, the rear of the (n+1)-th block $b_{n+1}$ of the digital audio signal is detected so that the output data T from the timer 15 are latched. Since the value $T_F$-T obtained by subtracting the data T from the data $T_F$ corresponding to the block length of the video signal is more than the prescribed value U (such as zero) at the time point $t_2$, the inserted data from the inserted data generation circuit 19 are selectively supplied from the switch 18 to the digital modulator 14 and recorded next to the (n+1)-the block $b_{n+1}$ of the digital audio signal. After the output data from the inserted data generation circuit 19 are selectively supplied from the switch 18 to the digital modulator 4 for the time $T_B$ corresponding to the block length of the digital audio signal, the selective supply of the digital audio data from the switch 18 to the digital modulator 4 is resumed at a time point $t_3$.

The inserted data corresponding to one block are thus recorded next to each of the (n+1)-th and (n+2)-th blocks $b_{n+1}$ and $b_{n+2}$ of the digital audio signal. However, at a time point $t_4$ when the rear of the (n+3)-th block $b_{n+3}$ of the digital audio signal is detected, the value $T_F$-T will be equal to or less than the prescribed value U. Note that new data obtained by adding the data TM which has been latched in the memory (not shown) within the controller 16 to a piece of remaining data T of the (n+3)-th block $b_{n+3}$ of the digital audio signal is larger than the data $T_F$ as is shown in FIGS. 5A and 5B. Accordingly, the (n+4)-th block $b_{n+4}$ of the digital audio signal is recorded contiguously to the (n+3)-th block $b_{n+3}$ thereof. As a result, the blocks of the digital audio signal which correspond to those of the video signal are recorded nearly in the same positions as the other one-block-preceding blocks of the video signal by the recorder shown in FIG. 3

Although the count of the timer 15 is directly reset by the front detection signal in the recorder shown in FIG. 3, the present invention is not limited to such an arrangement, and may otherwise be embodied so that the count of the timer is reset by the controller 16 on the basis of the interruption of the front detection signal.

FIG. 6 shows in block diagram form a player for reproducing the information recorded on a recording disk 21 by the recorder shown in FIG. 3. In the player, the recording disk 21 is rotated at a speed of 1,800 rpm by a spindle motor 22 and the recorded information is read optically, magnetically or electrostatically through a pickup 23. An RF (radio frequency) signal read by the pickup 23 is supplied to a separation circuit 24 composed of a bandpass filter for separating the RF video signal from the RF signal read from the disk, and another bandpass filter for separating the RF digital signal from the RF signal read from the disk. The RF digital signal from the separation circuit 24 is supplied to a reproduced clock signal generation circuit 25 including an RF amplifier. A reproduced clock signal for demodulation is produced by the reproduced clock signal generation circuit 25. The output of the RF amplifier is supplied together with the reproduced clock signal to an EFM demodulation circuit 26 including a frame synchronizing circuit. The demodulation output from the EFM demodulation circuit 26 is processed by a data processing circuit 27 which performs de-interleaving of the demodulated data signal, error detection, correction compensation, etc. Subsequently, the demodulation output is first stored in a data memory 28 and then read therefrom in response to a clock signal from a clock signal generation circuit 29. The demodulation output is then converted into analog signals by a D/A (digital-/analog) converter 30. The analog signals are applied as right- and left-channel audio signals through a low-pass filter 31.

The RF video signal from the separation circuit 24 is supplied to an FM (frequency modulation) demodulator 32 where the video signal is demodulated. The video signal is supplied to a video output terminal and a synchronizing signal separation circuit 33 which separates the horizontal synchronizing signal from the video signal. The horizontal synchronizing signal is supplied to a servo circuit 34 which controls the rotational frequency of the spindle motor 22 and the reading operation of the pickup 23 to sequentially read the recorded information from the recording disk 21.

Although the above-described player does not have a delay device for delaying the audio information, the audio signal reproduced at the same time as the video signal corresponds to the one field preceding the present field of the video signal, and hence the time difference between the video signal and the audio signal is not larger than one field. For that reason, the viewer perceives the video information and the audio information, which relate to each other, as being reproduced at the same time. Therefore, the reproduction of the video information and that of the audio information can be regarded as synchronized with each other. Moreover, since the time difference between the video information and the audio information is not larger than one field, the video information and the audio information which are recorded at a search address can be reproduced substantially synchronously with each other.

In a recording method provided in accordance with the present invention, while a block of video information is being recorded, recording of a block of prescribed information, such as audio information which corresponds to the block of video information which follows the currently recorded block, is started. For that reason, the time difference between the reproduction of the recorded video information and that of the recorded prescribed information corresponding thereto is made not larger than one block. This is accomplished without providing in the player a delay device for delaying the prescribed information. Therefore, the viewer perceives the reproduction of the recorded video information and that of the recorded prescribed information corresponding thereto as being synchronized with each other. Furthermore, since the time difference between the video information and the prescribed information is not larger than one block, the video information and the prescribed information which are recorded at a search address can be reproduced substantially synchronously with each other. As a result, the video information and the prescribed information can be efficiently utilized.

Another embodiment of the invention will next be described with reference to FIGS. 7 and 8. In this embodiment, an FIFO (first in first out) memory is used in lieu of the buffer memory 17 as used in the embodiment shown in FIG. 3, with which the function achieved by the embodiment of FIG. 3, is similarly achieved.

Referring to FIG. 7, the front detection signal is outputted from output of the video block front detector 14 and is directly supplied to the controller 16. Upon reception of the front detection signal, the controller 16 supplies to the FIFO memory 20 with a command for reading one digital audio data block from the digital audio signal generator 3. In response to the reading command supplied from the controller 16, one digital audio data block following the digital audio block of the corresponding video data block is read out of the digital audio signal generator 3. The controller 16 further supplies to a switch 18 with a command to changeover the moving contact thereof to receive the digital audio signal. When reading of one block digital audio data has completed, the movable contact of the switch 18 is changed over to another tap in response to a changeover command generated from the controller. The changeover command is generated in response to an end signal generated from a block end detector 21 which detects the end of one block audio data. In accordance with the changeover of the movable contact of the switch 18, the reading of data from the FIFO memory 20 is interrupted and the insertion data is received from the inserted data generator 19. The insertion data following the end of one digital audio data block has a duration corresponding to the length of the remainder of the video data block exceeding the length of the digital audio data block. Then the video data block and the digital audio data block to which the insertion data is added are mixed in the mixer 5 where the digital audio data block following the digital audio data corresponding to the video data block is disposed at the front of the video data block.

What is claimed is:

1. A method for recording video information divided into a plurality of blocks together with audio information divided into a plurality of blocks corresponding to those of said video information in a multiplex manner on a recording medium, comprising the steps of:
   (a) storing a first block of said audio information received from an audio information source;
   (b) detecting the start of recording of a block of said video information one block preceding the stored first block of said audio information;
   (c) starting the recording of said first block of said audio information;
   (d) storing a second, next subsequent block of said audio information;
   (e) at the end of recording of said first block of said audio information, determining whether a remaining time for recording of said block of said video information is greater than a predetermined value;

(f) if said remaining time is greater than said predetermined value, holding said second block of said audio information and recording a block of inserted data for said audio information; and (g) if said remaining time is less than said predetermined value, reading out and recording said second block of said audio information.

2. The recording method of claim 1, wherein said recording is done by mixing the audio information or inserted data with the video information to produce a mixed signal, and recording the mixed signal.

3. The recording method of claim 1, wherein said inserted data corresponds to audio silence.

4. The recording method of claim 1, wherein, in said step (f), said holding comprises generating a delay signal effecting retention of said second block of said audio information.

5. The recording method of claim 4, wherein; in said step (g), said reading out comprises stopping said delay signal.

6. A method for recording video information divided into a plurality of blocks together with audio information divided into a plurality of blocks corresponding respectively to those of said video information in a multiplex manner on a recording medium, comprising the steps of:

(a) receiving an n-th block of said video information from a video information source;

(b) detecting a start of said n-th block of said video information;

(c) instructing to start reading an (n+1)-th block of said audio information corresponding to an (n+1)-th block of said video information out of an audio information source, said (n+1)-th block of said video information following said n-th block of said video information, wherein step (c) is implemented in response to detection of the start of said n-th block of said video information in step (b);

(d) detecting an end of said (n+1)-th block of said audio information;

(e) instructing to stop reading said (n+1)-th block of said audio information out of said audio information source in response to said detection in step (d);

(f) adding an insertion data to the end of said (n+1)-th block of said audio information said insertion data being of a length which varies according to a length of said (n+1)-th block of audio information;

(g) mixing said (n+1)-th block of said audio information to which said insertion data is added and said n-th block of said video information to produce a mixed data; and (h) recording said mixed data.

7. The recording method of claim 6, wherein the start of said n-th block of said video information and a start of said (n+1)-th block of said audio information are in coincidence with each other.

8. A method for recording video information divided into a plurality of blocks together with audio information divided into a plurality of blocks corresponding respectively to those of said video information in a multiplex manner on a recording medium, comprising the steps of:

(a) receiving an n-th block of said video information from a video information source;

(b) detecting a start of said n-th block of said video information;

(c) instructing to start reading an (n+1)-th block of said audio information corresponding to an (n+1)-th block of said video information out of an audio information source, said (n+1)-th block of said video information following said n-th block of said video information, wherein step (c) is implemented in response to detection of the start of said n-th block of said video information in step (b);

(d) detecting an end of said (n+1)-th block of said audio information;

(e) instructing to stop reading said (n+1)-th block of said audio information out of said audio information source in response to said detection in step (d);

(f) adding an insertion data to the end of said (n+1)-th block of said audio information said insertion data being of a predetermined length;

(g) mixing said (n+1)-th block of said audio information to which said insertion data is added and said n-th block of said video information to produce a mixed data; and (h) recording said mixed data;

wherein the start of said n-th block of said video information and a start of said (n+1)-th block of said audio information are in coincidence with each other, and wherein a length of said block of insertion data has a duration corresponding to a length of a remainder of said n-th block of said video information exceeding a length of said (n+1)-th block of said audio information.

9. An apparatus for recording video information divided into a plurality of blocks together with audio information divided into a plurality of blocks corresponding respectively to those of said video information in a multiplex manner on a recording medium, comprising:

(a) a video information source;

(b) an audio information source;

(c) receiving means for receiving an n-th block of said video information from said video information source;

(d) first instructing means for instructing to start reading an (n+1)-th block of said audio information corresponding to an (n+1)-th block of said video information out of said audio information source, in response to a detection signal outputted from a first detecting means, said (n+1)-th block of said video information following said n-th block of said video information;

(e) second detecting means for detecting an end of said (n+1)-th block said audio information;

(f) second instructing means for instructing to stop reading said (n+1)-th block of said audio information in response to a detection signal outputted from said second detecting means;

(g) adding means for adding an insertion data to the end of said (n+1)-th block of said audio information said insertion data being of a length which varies according to a length of said (n+1)-th block of audio information;

(h) mixing means for mixing said (n+1)-th block of said audio information to which said insertion data is added and said n-th block of said video information to produce a mixed data; and (i) recording means for recording said mixed data.

10. The recording apparatus of claim 9, wherein the start of said n-th block of said video information and a start of said (n+1)-th block of said audio information are in coincidence with each other.

11. An apparatus for recording video information divided into a plurality of blocks together with audio information divided into a plurality of blocks corresponding respectively to those of said video information in a multiplex manner on a recording medium, comprising:

(a) a video information source;
(b) an audio information source;
(c) receiving means for receiving a n-th block of said video information from said video information source;
(d) first instructing means for instructing to start reading an (n+1)-th block of said audio information corresponding to an (n+1)-th block of said video information out of said audio information source, in response to a detection signal outputted from a first detecting means, said (n+1)-th block of said video information following said n-th block of said video information;
(e) second detecting means for detecting an end of said (n+1)-th block of said audio information;
(f) second instructing means for instructing to stop reading said (n+1)-th block of said audio information in response to a detection signal outputted from said second detecting means;
(g) adding means for adding an insertion data to the end of said (n+1)-th block of said audio information, said insertion data being of a predetermined length;
(h) mixing means for mixing said (n+1)-th block of said audio information to which said insertion data is added and said n-th block of said video information to produce a mixed data; and
(i) recording means for recording said mixed data;
wherein the start of said n-th block of said video information and a start of said (n+1)-th block of said audio information are in coincidence with each other; and
wherein a length of said block of insertion data has a duration corresponding to a length of a remainder of said n-th block of said video information exceeding a length of said (n+1)-th block of said audio information.

* * * * *